Nov. 23, 1954   I. G. CRUCKSHANK   2,695,055
FUEL SYSTEM FOR THERMAL-POWER PLANTS
Filed July 15, 1949   2 Sheets-Sheet 1
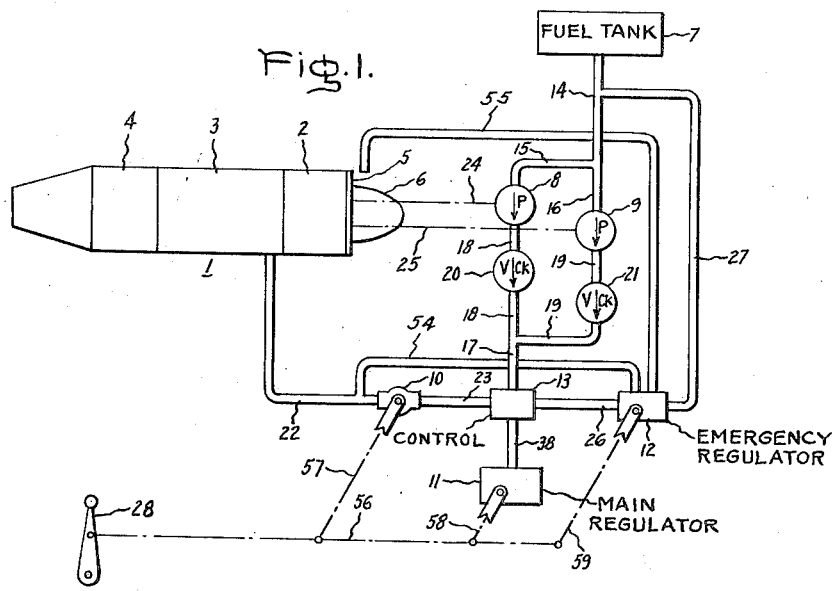
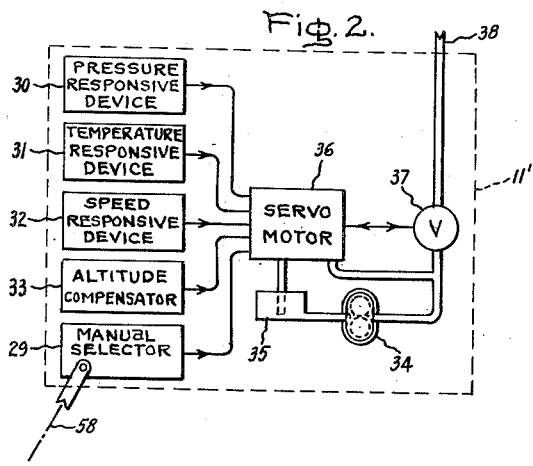
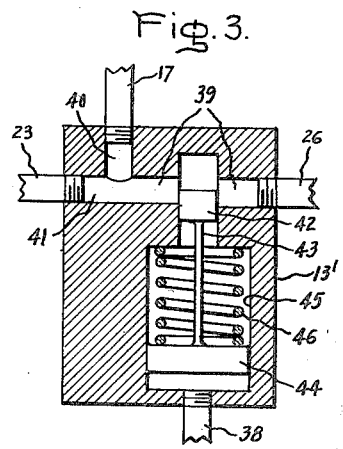
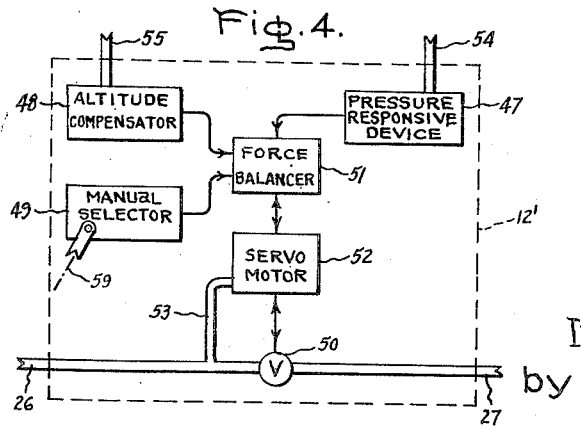
Inventor:
Ira G. Cruckshank,
by
His Attorney.

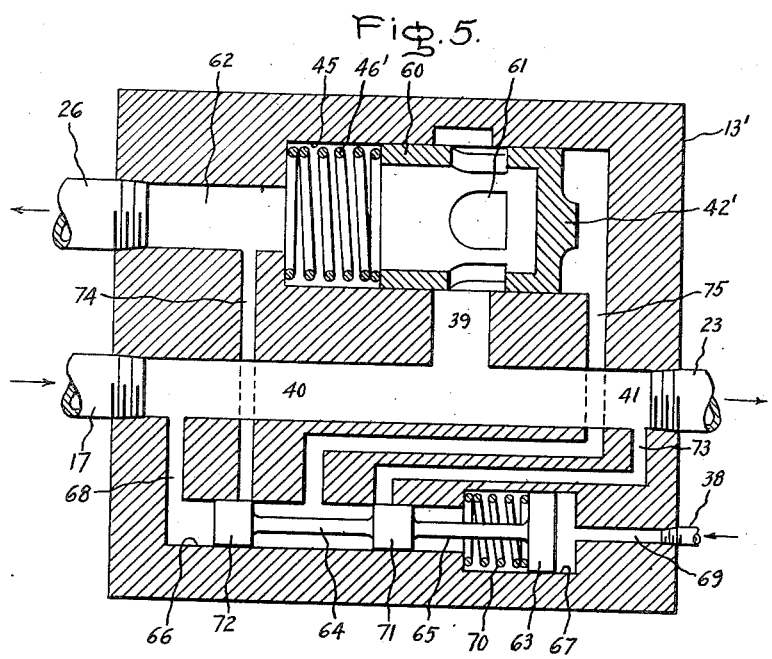

United States Patent Office 2,695,055
Patented Nov. 23, 1954

2,695,055

FUEL SYSTEM FOR THERMAL POWER PLANTS

Ira G. Cruckshank, Malden, Mass., assignor to General Electric Company, a corporation of New York Application July 15, 1949, Serial No. 104,962

6 Claims. (Cl. 158—36.4)

This invention relates to thermal-powerplants, and particularly to fuel systems for supplying fuel to such powerplants. It is of particular significance in connection with powerplants for aircraft service.

Control of gas turbine powerplants for aircraft service presents an extremely difficult problem due to the various changes in operating conditions to which these powerplants are subjected. These variations may include a wide range of ambient atmospheric pressure, temperature, speed and load, thus requiring correspondingly great changes in the rate of fuel supply. Thermal powerplants used for the propulsion of aircraft may comprise a compressor, combustion chambers and a turbine arranged in series flow relation to keep the powerplant weight and overall diameter to a minimum. Such powerplants must operate from sea level to very high altitudes, often exceeding 35,000 feet, and since this type of powerplant employs components of the so-called constant volume type, the weight flow of air through the powerplant under varying altitude conditions may vary in the order of 10–20 to 1 and therefore the fuel flow rate must vary approximately in the same order of magnitude. Control of the flow of fuel to the powerplant is effected by various regulating devices which may be of the type actuated by servomotor means employing oil or a similar fluid. Because the viscosity of oil increases with decreasing temperature, starting of the powerplant often becomes very difficult and in some cases impossible under low temperature atmospheric conditions, since the fuel regulating devices may be rendered temporarily inoperative due to congealing of the oil.

Another problem which is encountered particularly in aircraft service is in the provision of an emergency fuel system. The provision of such a system is a mandatory requirement in this type of service in the interest of safety and the emergency system must be capable of providing uninterrupted flow of fuel to the powerplant in the event of failure of any of the main fuel system components.

Accordingly, an object of the invention is to provide an improved fuel system for obviating the above-mentioned difficulties.

Another object of the invention is to provide a fuel system for thermal powerplants which provides new and improved control means for starting and operating such powerplants under extreme low temperature atmospheric conditions.

Still another object of the invention is to provide a new and improved fuel system arrangement for aircraft service whereby efficient control and safe operation are assured even in the event of failure of various components of the system; and the physical size of certain components is reduced thereby resulting in substantial weight savings.

Still another object is to provide a new and improved flow control device for use with such an improved fuel system.

Other objects and advantages will be apparent from the following description taken in connection with the accompanying drawings, in which Fig. 1 illustrates a fuel system arranged in accordance with the invention; Figs. 2–5 are diagrammatic views of various control components for use with the system shown in Fig. 1.

Referring now to Fig. 1, a gas turbine powerplant 1 may comprise a compressor 2, combustion chambers 3, and a turbine 4 arranged in series flow relation. The compressor receives air through an inlet 5 from the ambient atmosphere and delivers it at increased pressure and temperature to the combustion chambers. Fuel is introduced and mixed with this air to form a combustible mixture which is then burned in the combustion chambers to raise the temperature of the air to a still higher level before it is delivered to the turbine. This high-temperature, high-pressure air is utilized as motive fluid for driving the turbine which extracts at least sufficient power from the fluid to drive the compressor and certain accessories necessary to the operation of the powerplant. The remaining power is available for propulsion of the aircraft either as mechanical power for driving a propeller, or by discharging the fluid at high velocity relative to the aircraft as in jet propelled aircraft. Powerplants of this type are usually provided with an accessory section 6, comprising suitable mounting pads and gearing for driving various accessories, for example, fuel and lubrication pumps. The mechanical details of such powerplants are not material to an understanding of the present invention and are more particularly described in U. S. Patent 2,432,359—Streid, and in copending applications Serial No. 506,930, filed October 20, 1943, now Patent 2,479,573, and Serial No. 541,565, filed June 22, 1944, in the name of Alan Howard, and assigned to the same assignee as the present application.

My improved fuel system includes a fuel tank or reservoir 7, at least two pumps 8, 9, connected in parallel, a shut-off valve or stop cock 10, a regulating device 11 referred to herein as the main regulator, a second regulating device 12 referred to herein as the emergency regulator, a control 13, and a manual control lever 28.

*Arrangement of system components*

The pumps are connected in parallel to fuel tank 7 by a common inlet conduit 14 and branch conduits 15, 16 connected to pumps 8 and 9, respectively. Each pump delivers fuel to a common discharge conduit 17 to which are connected branch discharge conduits 18, 19. Branch conduits 18, 19 are connected to the discharge of pumps 8 and 9, respectively. Check valves 20, 21 for preventing backward flow of fuel through the pumps are included in branch conduits 18, 19, respectively. Connection between the powerplant 1 and common discharge conduit 17 is established by connecting control 13 to conduit 17 and providing conduits 22, 23 which connect the powerplant, shut-off valve 10, and control 13 in series flow relation.

Pumps 8, 9 are secured to suitable mounting pads (not shown) and, as indicated by broken lines 24, 25, are driven by the powerplant. During operation of the powerplant, fuel is drawn from fuel tank 7 by both pumps, or by either pump, and delivered under pressure to the powerplant 1 through conduits 17, 18, 19, control 13, conduit 23, shut-off valve 10, and conduit 22.

Since the powerplant must operate under variable operating conditions, the rate of fuel flow required by the powerplant may vary over a wide range as previously indicated. Fuel delivered by the pumps in excess of the requirements of the powerplant is returned to the pump inlets, or to the fuel tank, by a by-pass arrangement. Control device 13 performs the function of by-passing excess fuel at a controlled variable rate. The construction and operation of such a control device which may be used in my improved fuel system will be more fully described hereinafter. Fuel which is by-passed by control 13 is returned therefrom to the common inlet 14 by conduits 26, 27 having emergency regulator 12 connected in series therewith.

*Fuel pumps*

My improved fuel system does not require the use of variable displacement pumps. Any desired type of constant displacement pump may be employed so that weight and complexity are reduced and reliability is greatly improved. Since the pumps are connected to the powerplant, as previously indicated, the rotational speed and thus the rate of fuel delivered by the pumps is a function of the rotational speed of the powerplant.

Main fuel regulator

The purpose of the main fuel regulator is to control the rate of fuel flow to the powerplant as a function of the position of operator's control lever 28 and thus secure a desired output of the powerplant. A number of condition responsive devices are provided to vary a control pressure generated by the regulator automatically in response to changes in certain operating conditions of the powerplant, as well as mechanism for manipulation by the operator to select the desired load output of the powerplant.

Referring now to Fig. 2, the condition-responsive devices within the regulator vary the control pressure output of the regulator in accordance with a preselected schedule in response to certain operating conditions which may include a manual selector control 29, a pressure responsive device 30 arranged to sense an operating pressure at any desired location between the discharge of said pumps and the powerplant, a temperature responsive device 31 arranged to sense a temperature level at which the powerplant is operated, a speed responsive device 32 arranged to sense rotational speed of the powerplant, and an altitude compensating device 33 arranged to recalibrate the regulator so that a given position of the operator's control 28 always produces a predetermined percentage of full-load rating of the powerplant irrespective of altitude.

Within the regulator is a control oil pump 34 which furnishes pressurized oil to a servomotor 36 and a regulating valve 37. Pump 34 obtains its oil from the reservoir 35 located within the regulator casing 11'. Signals from the condition-responsive devices are transmitted to the servomotor 36 which effects positional changes in valve 37 to vary the variable control pressure output 38 of the regulator. Referring again to Fig. 1, the variable control pressure output of the regulator is connected to control 13 by conduit 38. Variations in the control pressure are thus transmitted to control 13 which effects a change in the rate of by-pass fuel flow in accordance with the operating needs of the powerplant. A regulator of this type is described in greater detail in a copending application in the name of Martin A. Edwards, Donald E. Garr, and Hugh M. Ogle, Serial No. 605,960, filed July 19, 1945 now Patent No. 2,622,393, issued December 23, 1952, and assigned to the assignee of the present application.

Control device

A suitable control device 13 which may be employed is illustrated diagrammatically in Fig. 3. The control includes a casing member 13' having an internal passage 39 and branch passages 40, 41 communicating with conduits 26, 17 and 23, respectively. An adjustable valve 42 having a stem 43 is provided in series with passage 39. As illustrated, valve 42 is a piston type valve but it will be obvious that other types of valve may be employed with equally good results. Connected to valve stem 43 is a piston 44 arranged to slide in a cylinder 45 provided within casing 13'. A compression spring 46 is provided to bias piston 44 and valve 42 to the open position of the valve. Valve 42 is shown in a nearly open position in Fig. 3. The lower end of cylinder 45 communicates with conduit 38 so that the variable control oil pressure output from regulator 11 is sensed by piston 44. As the control oil pressure increases, piston 44 and valve 42 are caused to move upward thus restricting the flow of fuel through passage 39. Piston 44 will continue to move until the control oil pressure force exerted against the piston is exactly balanced by the force of the deflected biasing spring 46. Likewise, as the control oil pressure decreases, spring 46 causes the piston and valve to move down until the spring force and the oil pressure force are again in balance.

Figure 5 shows a similar control device wherein the structural details of the control are illustrated with greater particularity. The control includes a casing member 13' having internal passages 39—41 and 62 communicating with conduits 26, 17 and 23. A combined valve and piston member 42' replaces the valve 42, stem 43, and piston 44. The combined valve and piston 42' comprises an axially extending annular portion 60 with one or more openings 61 provided therein, as indicated in the drawing. Communication is established between bore 45 and conduit 26 by the provision of a passage 62. Spring 46' is provided to bias valve 42' to its closed position. Casing member 13' is provided with a bore having portions of different diameters 66, 67 for slidably supporting servo piston 63 and pilot valve 64. A passage 68 is provided in casing member 13' for establishing connection between bore portion 66 and passage 40, and another passage 69 is also provided for establishing connection between bore portion 67 and conduit 38. Spring 70 biases servo piston 63 to the right side of bore portion 67. Servo piston 63 is operatively connected to pilot valve 64 by a rod 65. It will be appreciated, however, that any suitable means may be employed to effect connection between the servo piston and pilot valve.

As indicated in the drawing, pilot valve 64 comprises at least two spaced land portions 71, 72. A passage 73 establishes communication between passage 41 and bore portion 66 at land portion 71, as indicated in the drawing. Similarly, passage 74 establishes communication between passage 62 and bore portion 66 at land portion 72. Still another passage 75 is provided for establishing communication between bore 45 and bore portion 66 at a location between passages 73, 74. The spacing between passages 73 and 74 at their points of connection to bore 66 and the spacing between lands 71, 72 is such that, in the position shown in Fig. 5, there is no communication between passages 73, 74 except for minor leakage which does not adversely affect the operation of the device.

If pilot valve 64 is displaced to the right for any reason, communication is established between passages 73 and 75, thus allowing high pressure fuel discharged from the pumps to flow from conduit 17 through passages 40, 41 and establish an intermediate pressure in passage 75 which, tends to open valve 42' against the action of biasing spring 46'. If pilot valve 67 is displaced to the left from the position shown in the drawing, communication is established between passages 74, 75, thereby allowing some of the fuel trapped in passage 75 to be drained into low pressure conduit 26 and thus reduce the intermediate pressure acting on valve 42' and allow it to close under the action of biasing spring 46'. It will be appreciated by those skilled in the art that this biasing arrangement permits starting and operation of the powerplant, even though the pressures in passages 39—41, 68—69, and 73—75 may not be at their normal operating values because of sluggishness in response of regulator 11 following periods of idleness or because of operation under sub-zero ambient conditions which may cause congealing of the hydraulic fluid, since only a portion of the total fuel flow will be by-passed to conduit 26. In the event of failure of the main regulator 11 or conduit 38, control of the powerplant is effected by emergency regulator 12 in a manner to be described hereinafter.

Emergency regulator

Emergency regulator 12 is a second device for controlling the rate of flow of fuel bypassed through conduits 26, 27 to the common inlet conduit 14.

Referring now to Fig. 4, a number of condition-responsive devices which may include a device 47 responsive to a pressure appurtenant to the operation of the powerplant, an altitude compensating device 48, and a manually adjustable device 49 for preselecting a desired rate of bypass fuel flow are provided for influencing the functioning of a valve 50 which is connected in series with bypass conduits 26, 27. These condition-responsive devices are connected together by suitable linkage to form a force-balancing system 51. When the forces acting on the force-balancing system 51 become unbalanced, as a result of a change in signal from one or all of the condition-responsive devices 47, 48, 49, one of the linkage members is caused to move so as to impart positional changes to a pilot device which is part of a servomotor 52 for effecting positional changes of valve 50. A feature of the invention is that the actuating fluid for servomotor 52 is the fuel delivered by pumps 8, 9 as indicated by branch conduit 53 which connects the servomotor to conduit 26.

Referring now to Figs. 1 and 4, pressure responsive device 47 is arranged to sense the pressure of the fuel delivered to the powerplant. As illustrated in the drawings, pressure responsive device 47 is connected to conduit 22 by conduit 54 at a location immediately preceding the location at which conduit 22 is connected to the powerplant. It is to be understood, however, that conduit 54 may be connected to either conduit 22 or 23 at any desired location between the powerplant 1 and control 13. Altitude compensating device 48 is arranged to sense the ambient atmospheric pressure by a sensing conduit 55 which connects the compensator to any desired location for sensing ambient pressure. For purposes of illustration and not of limitation, conduit 55 is shown as being arranged to sense the pressure at the inlet 5 of the powerplant. A regulator suitable for use in my improved fuel system is described with greater particularity in a copending application in the name of Neil Burgess, Serial No. 103,264, filed July 6, 1949, now Patent No. 2,598,674 and assigned to the assignee of the present application.

Shut-off valve

The fuel shut-off valve 10 is intended for use in the wide-open and closed positions only. Suitable linkage indicated by broken lines 56, 57 is provided so that movement of the operator's control 28 is also transmitted to the stop cock. The linkage members are proportioned so that the stop cock is quickly moved to full-open position during approximately the first 10° of movement of the operator's control lever. Valves of this type are more particularly described in copending applications Serial No. 630,676, filed November 24, 1945, and Serial No. 682,554, filed July 10, 1946, in the name of Samuel R. Barr, now Patents 2,485,349 and 2,510,617 respectively, and assigned to the same assignee as the present application. Connecting linkage of the type described is more particularly described in the co-pending application in the name of Edwards, Garr and Ogle, previously referred to.

Manual control

Linkage members 56, 57, 58, 59, represented diagrammatically by the broken lines in Fig. 1, connect the emergency regulator 12, main regulator 11, and stop cock 10, so that motion imparted to the adjusting means of any one of these components is likewise imparted to the other components. The operator's control lever 28 is connected to linkage member 56 at any convenient location. Thus, any positional changes effected in the operator's control lever will be imparted to all three control components of the fuel system.

Operation

During normal operation and with the pilot's control lever in any position beyond the first 10–20 degrees of its travel so that stop cock 10 is in the open position, fuel is pumped from fuel tank 7 by the pumps 8, 9 to the powerplant through connecting conduits 14—16, 17—19, 22, 23, and control 13. The rate of fuel flow is automatically governed by regulator 11 in accordance with the preselected output determined by the position of the operator's control lever 28. If operating conditions change, or if the pilot selects a new position of his control lever, the condition responsive devices in regulator 11 co-act to produce a change in the variable control oil pressure output of the regulator. This change in magnitude of the variable control oil pressure acting on control 13 effects the required change in the position of valve 42 or 42' thus increasing or decreasing the rate of flow of by-passed fuel to conduit 26 which in turn decreases or increases the rate at which fuel is delivered to the powerplant through conduits 22, 23.

The emergency regulator 12 is scheduled to call for fuel pressures delivered to the stop-cock in accordance with the pressure schedule of regulator 11. However, the schedule of pressures called for by regulator 12 is arranged to be slightly less than those called for by regulator 11 for any given operating condition, so that under normal conditions valve 50 is open to a greater degree than valve 42 and the fuel delivered to the powerplant is under the control of the main regulator 11.

If regulator 11 becomes inoperative temporarily, or in the event of its complete failure, emergency regulator 12 automatically provides a controlled and uninterrupted supply of fuel at the proper pressure to the powerplant if at least one of pumps 8, 9 remains in operation. Likewise, either regulator will control the flow from one or both pumps upon failure of the other regulator. In addition, since the fluid for actuating the servomechanism portion 52 of regulator 12 is the fuel delivered by pumps 8, 9 which does not freeze or congeal at ambient atmospheric temperatures which are sufficiently low to cause freezing or congealing of the control oil output of regulator 11 and due to the biasing arrangement of valve 42', my improved fuel system also permits starting and operation of the powerplant under extremely low temperature atmospheric conditions under which the main controls may be rendered inoperative temporarily.

While a particular embodiment of the invention has been illustrated and described, it will be apparent to those familiar with the art that various changes and modifications may be made without departing from the invention, and it is intended to cover in the appended claims all such changes and modifications that come within the true spirit and scope of the invention.

What I claim as new and desire to secure by Letters Patent is:

1. In a fuel supply system for a thermal powerplant having pumping means driven by the powerplant, means connecting said pumping means to the powerplant and including a flow control device operable in response to a variable control pressure to by-pass variable portions of the flow delivered by the pumping means, said control device having an inlet port and a by-pass port and a control pressure port, means for supplying a variable control pressure to said pressure port, said control device also including biasing means opposed to the variable control pressure for establishing communication between the inlet and by-pass ports when the variable control pressure supply means becomes inoperative, and means connected to said by-pass port in series flow relation and including a flow regulating device for regulating the by-pass flow, said flow regulating device including valve means and valve positioning means connected to said valve means and operable in response to variations in the pressure of the fuel delivered to the powerplant.

2. In a fuel supply system for a thermal powerplant having at least two constant displacement pumps connected in parallel flow relation and driven by the powerplant, means connecting said parallel connected pumps to the powerplant and including a flow control device operable in response to a variable control pressure to by-pass variable portions of the flow from said pumps, said control device having an inlet port and a by-pass port and a control pressure port, means for supplying a variable control pressure to said pressure port, said control device also including biasing means opposed to the variable control pressure for establishing communication between the inlet and by-pass ports, and means including a regulator connected in series flow relation to said by-pass port for regulating the by-pass flow, said regulator including valve means and fuel actuated fluid motor means connected to said valve means and operable to increase the rate of by-pass flow in response to an increase in the pressure of the fuel delivered to the powerplant and to decrease said rate of by-pass flow in response to a decrease in said pressure.

3. In a fuel supply system for a thermal powerplant having a rotor, pumping means, means for driving said pumping means at a speed proportional to the rotational speed of the rotor, a combination comprising means connecting said pumping means to the powerplant and including a flow control device operable to by-pass variable portions of the flow from said pumping means in response to the variable control pressure, said control device having an inlet port and a by-pass port and a control pressure port, means for supplying a variable control pressure to said pressure port, said control device also including biasing means opposed to the variable control pressure for establishing communication between the inlet and by-pass ports if the variable control pressure supply means becomes inoperative, and a regulating device connected in series flow relation to said by-pass port for regulating the rate of by-pass flow, said regulating device including valve means and fuel actuated servo motor means connected to said valve means and operable to increase the rate of by-pass flow in response to an increase in the pressure of the fuel delivered to the powerplant and to decrease the rate of by-pass flow upon a decrease of fuel delivery pressure.

4. In a fuel supply system for a rotary thermal powerplant having constant displacement pumping means driven at a speed proportional to the rotational speed of the powerplant, a regulator of the type having means for supplying a variable control pressure and including means for preselecting a rate of fuel flow to secure a desired output of the powerplant and also having a plurality of devices operable in response to a plurality of operating conditions of the powerplant to modulate said control pressure, the combination comprising means connecting said pumping means to the powerplant and including a flow control device operable in response to said variable control pressure to by-pass variable portions of the flow from said pumping means, said control device having an inlet port and a by-pass port and a control pressure port, means for supplying said variable control pressure to the control pressure port, said control device also including biasing means opposed to the variable control pressure for establishing communication between the inlet and by-pass ports if the variable control pressure supply means becomes inoperative, an operator's control member, flow regulating means connected in series flow relation to said by-pass port for controlling the rate of by-pass flow, said flow regulating means including means for preselecting a desired rate of by-pass flow in accordance with a predetermined function of the pressure of the fuel delivered to the powerplant and compensating means for increasing the rate of by-pass flow as a predetermined function of altitude, and means connecting the preselecting means of the flow regulating means to the operator's control member and to the regulator preselecting means.

5. Apparatus in accordance with claim 4 wherein flow regulating means includes valve means for controlling the flow in said by-pass conduit means, and hydraulic servo motor means actuated by fuel delivered to said pumping means and operable in response to changes in pressure of the fuel delivered to the powerplant and to changes in altitude for positioning said valve means.

6. Apparatus in accordance with claim 4 wherein the flow regulating means includes valve means and hydraulic servo motor means connected to said valve means and operable to open or close said valve means in response to an increase or decrease respectively in the delivery pressure of said pumping means and also operable to open said valve means in response to a decrease in the ambient atmospheric pressure.

References Cited in the file of this patent

UNITED STATES PATENTS

| Number | Name | Date |
|---|---|---|
| 2,136,959 | Winfield | Nov. 15, 1938 |
| 2,404,428 | Bardbury | July 23, 1946 |
| 2,437,480 | Pugh et al. | Mar. 9, 1948 |
| 2,440,371 | Holley | Apr. 27, 1948 |
| 2,473,953 | Huber et al. | June 21, 1949 |
| 2,479,813 | Chamberlin et al. | Aug. 23, 1949 |
| 2,489,586 | Ray | Nov. 29, 1949 |
| 2,596,815 | Keil | May 13, 1952 |

FOREIGN PATENTS

| Number | Country | Date |
|---|---|---|
| 918,042 | France | Oct. 7, 1946 |